United States Patent [19]
Hashizawa et al.

[11] Patent Number: 5,873,737
[45] Date of Patent: Feb. 23, 1999

[54] CONNECTOR WITH LOW PASSING-THROUGH MAGNET FORCE

[75] Inventors: Shigemi Hashizawa; Shigeo Mori; Toshiyuki Sekimori; Yasuyoshi Fukao, all of Shizuoka, Japan

[73] Assignee: Yazaki Corporation, Tokyo, Japan

[21] Appl. No.: 800,196

[22] Filed: Feb. 13, 1997

[30] Foreign Application Priority Data

Feb. 16, 1996 [JP] Japan ..................................... 8-029532

[51] Int. Cl.⁶ .................................................. H01R 11/30
[52] U.S. Cl. ............................................. 439/39; 439/310
[58] Field of Search .............................. 439/39, 310, 311, 439/352

[56] References Cited

U.S. PATENT DOCUMENTS

| | | | |
|---|---|---|---|
| 4,836,791 | 6/1989 | Grabbe et al. | 439/79 |
| 5,350,312 | 9/1994 | Kuno et al. | 439/310 |
| 5,417,579 | 5/1995 | Yoshioka et al. | 439/310 |
| 5,474,472 | 12/1995 | Niwa et al. | 439/608 |
| 5,558,533 | 9/1996 | Hashizawa et al. | 439/310 |
| 5,573,417 | 11/1996 | Hashizawa et al. | 439/310 |
| 5,575,675 | 11/1996 | Endo et al. | 439/310 |
| 5,751,135 | 5/1998 | Fukushima et al. | 439/476.1 |

FOREIGN PATENT DOCUMENTS

| | | |
|---|---|---|
| 0 630 078 A2 | 12/1994 | European Pat. Off. . |
| 50-95790 | 7/1975 | Japan . |
| 57-128782 | 8/1982 | Japan . |
| 58-113975 | 8/1983 | Japan . |
| 60-24539 | 6/1985 | Japan . |
| 1-73774 | 5/1989 | Japan . |
| 5-290927 | 11/1993 | Japan . |
| 6-290836 | 10/1994 | Japan . |
| 7-65900 | 3/1995 | Japan . |

*Primary Examiner*—Neil Abrams
*Attorney, Agent, or Firm*—Armstrong, Westerman, Hattori, McLeland & Naughton

[57] ABSTRACT

A male connector (B) includes an outer housing (10) equipped with a rotatable lever (31) and an inner connector (20) which moves in an axial direction in the outer housing by rotation of the lever. A female connector (A) includes a shell for receiving the male connector; the male and female connectors having abutting faces (36 and 4) abutting on each other by magnetic force when the inner connector (20) and the female connector (A) are engaged with each other, at least one of the abutting faces being made of magnet (35). The male and female connectors can constitute a provisional locking structure before substantial magnetic adsorption force due to proximity of the male and female connectors. The male and female connectors are coupled to each other to connect terminals mounted in the male and female connectors to each other. Even if a strong magnet is used to couple relatively large connectors with each other, they can be separated by small force.

4 Claims, 9 Drawing Sheets

CONNECTOR WITH LOW PASSING-THROUGH MAGNET FORCE

BACKGROUND OF THE INVENTION

1. Field of the Invention

The present invention relates to a connector assembly with low passing-through force using a magnet and a lever for coupling and separating of a pair of female and male connectors.

2. Description of the Prior Art

A coupling structure as shown in FIG. 9 has been proposed in which uses a magnet in order to hold a pair of connectors and obtain contact load with a partner terminal (JP-B-58-113975).

Figure 8:
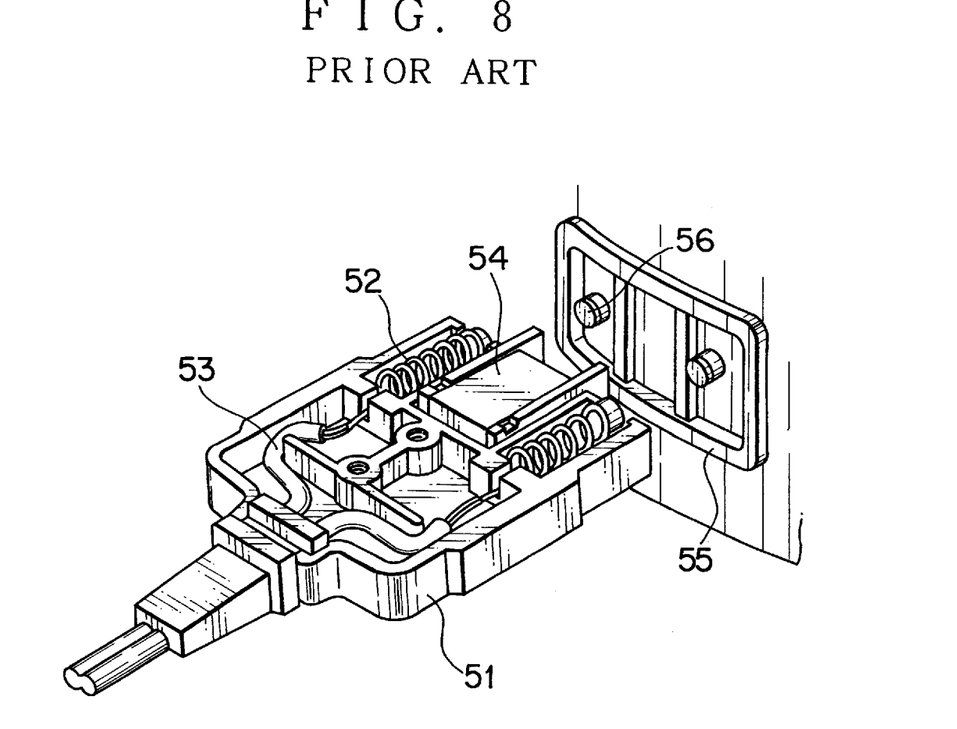
FIG. 8 is an explanation view of a prior art.

In FIG. 8, reference numeral 51 denotes a connecting device body serving as a connector, and 55 denotes an attaching section where an electric appliance such as an electric water heater is to be attached. The connecting body 51 includes conductive coil springs 52 with their rear ends internally secured and lead wires 53 for power source cords connected to the rear ends and a magnet 54. The connecting body 51 is adsorbed and locked to the attaching area by the magnetic force of the magnet 54 so that the tips of the coil springs 52 abut on the corresponding connecting pins 56 of the attaching section 55 to be electrically connected thereto.

In FIG. 8, the connecting body 51 adsorbed and held to the attaching area 55 can be easily removed by pushing the end of the connecting body 51 on the side of the lead wires downward or upward owing to the theory of leverage. However, since force in an slanting direction is directly exerted on the end surfaces of the coil springs 52 and connecting pins 56 constituting connecting terminals so that the connecting terminal may be entangled and injured.

Figure 9A:
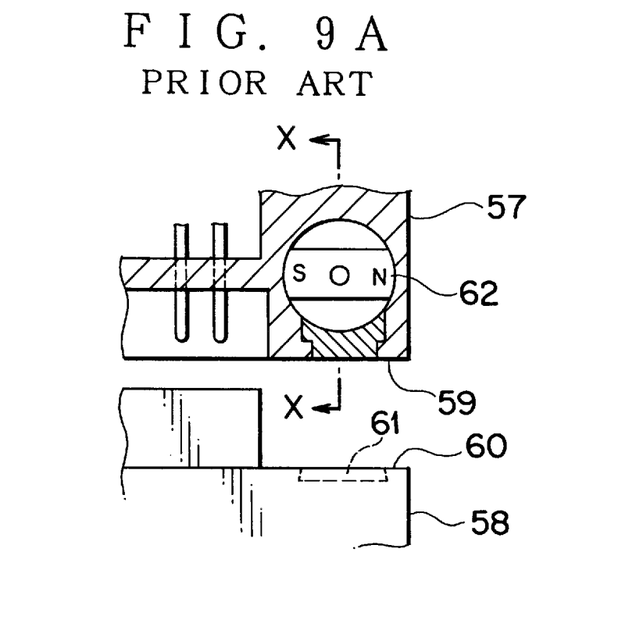
FIG. 9A is a partial sectional view of the separated state of a pair of male and female connectors.
Figure 9B:
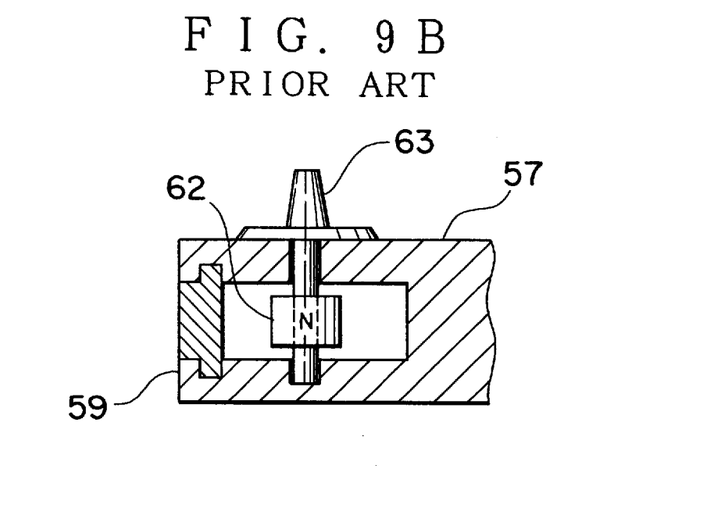
FIG. 9B is a sectional view taken in line X—X in FIG. 9A.

FIGS. 9A and 9B show a connector assembly according to another prior art using a magnet as disclosed in JP-B-1-73774. In this connector assembly, abutting faces are formed on a female connector 57 and male connector 58, respectively which abut on each other when both connectors 57 and 58 are engaged with each other. The one abutting face 60 is made of magnetic substance. The connector on the side of the other abutting face 59 is provided with a magnet which can be rotated in a direction of contacting or separating the magnetic pole with or from the abutting face 59 by a knob.

The coupling structure as shown in FIG. 8 can be used for a connector for passing a large current for e.g. charging of an electric vehicle. This coupling structure is advantageous for a connector used at the place where sand or dust is apt to be applied in that it decreases the area suffering from friction force.

In the case of the connector for a large current, the contact load of a terminal and holding force of a connector must be increased in proportion to a current value. For this purpose, if the adsorption force of a magnet is increased, collision may occur in connector coupling. The shock thus produced may destroy the magnet. A hand or finger may be caught. When the adsorption force is increased to enhance the holding force, removing force is increased, thus making a removing operation difficult.

In the case of the connector assembly shown in FIG. 9, with the magnetic force of the magnet 62 increased, if the magnetic pole of the magnet 62 is opposite to the connector member 58 before the male and female connectors 57 and 58 are coupled with each other, connector coupling can be easily effected by the magnetic force. As in the above case, the abutting face or terminal may be broken and also large force is required for separation.

SUMMARY OF THE INVENTION

An object of the present invention is to provide a connector assembly which uses a strong magnet to couple relatively large connectors with each other but can separate them by small force, and gives no fear of injuring the terminal in removal.

In order to attain the above object, in accordance with the present invention, there is provided a connector assembly comprising: a first connector including an outer housing equipped with a rotatable lever and an inner housing which moves in an axial direction in said outer housing by rotation of said lever; a second connector including a shell for receiving said first connector; said first and second connectors having abutting faces abutting on each other by magnetic force when said inner connector and said second connector are engaged with each other, at least one of said abutting faces being made of magnet; material and said first and second connectors being capable of constituting a provisional engagement structure before substantial magnetic adsorption force due to proximity of said first and second connectors, whereby said first and second connectors are coupled to each other to connect terminals mounted in the first and second connectors to each other.

In this structure, when the inner connector and the second connector are coupled with each other by rotation of the lever, since magnetic force gradually increases owing to their proximity, magnetic adsorption force increase with an increase in coupling force. Thus, the first connector and second connector can be coupled by small insertion force. In addition, damage of the magnet by collision between the first and second connectors can be prevented.

Further, since the first and second connectors can constitute a provisional locking structure before substantial magnetic adsorption force due to proximity of said first and second connectors is generated, low insertion force due to magnetic coupling can be attained. The collision between the terminals in the first and second connectors can be prevented by magnetic force so that low insertion force can be attained by the lever and magnetic force. Further, even when the magnetic coupling between the first and second connector is released by pulling of the lever, the provisional locking structure can be maintained so that the connector will not fall away.

Further, the connector assembly has a preferable structure in which said provisional engagement structure includes a provisional locking arm which can protrude from a window provided in a front half of said outer housing of said first connector and has a first locking member at its tip, and a second locking member provided at an end of an inner wall of said shell, said first locking piece is normally urged to protrude from said window, and said first and second locking pieces are locked to each other when said outer housing is received into said shell to constitute said provisional coupling structure. Therefore, since the provisional locking state of the first connector and the second connector is maintained in a simple structure.

Further, in the connector assembly according to the present invention, preferably, said outer housing has a locking releasing lever for releasing the provisional locking state of said provisional locking arm. Thus, as long as the locking bar is not operated, the coupling of the first and second connector will not come off inadvertently.

The above and other objects and features of the present invention will be more apparent from the following description taken in conjunction with the accompanying drawings.

DESCRIPTION OF THE PREFERRED EMBODIMENTS

Now referring to the drawings, an explanation will be given of an embodiment of the present invention.

Figure 1:
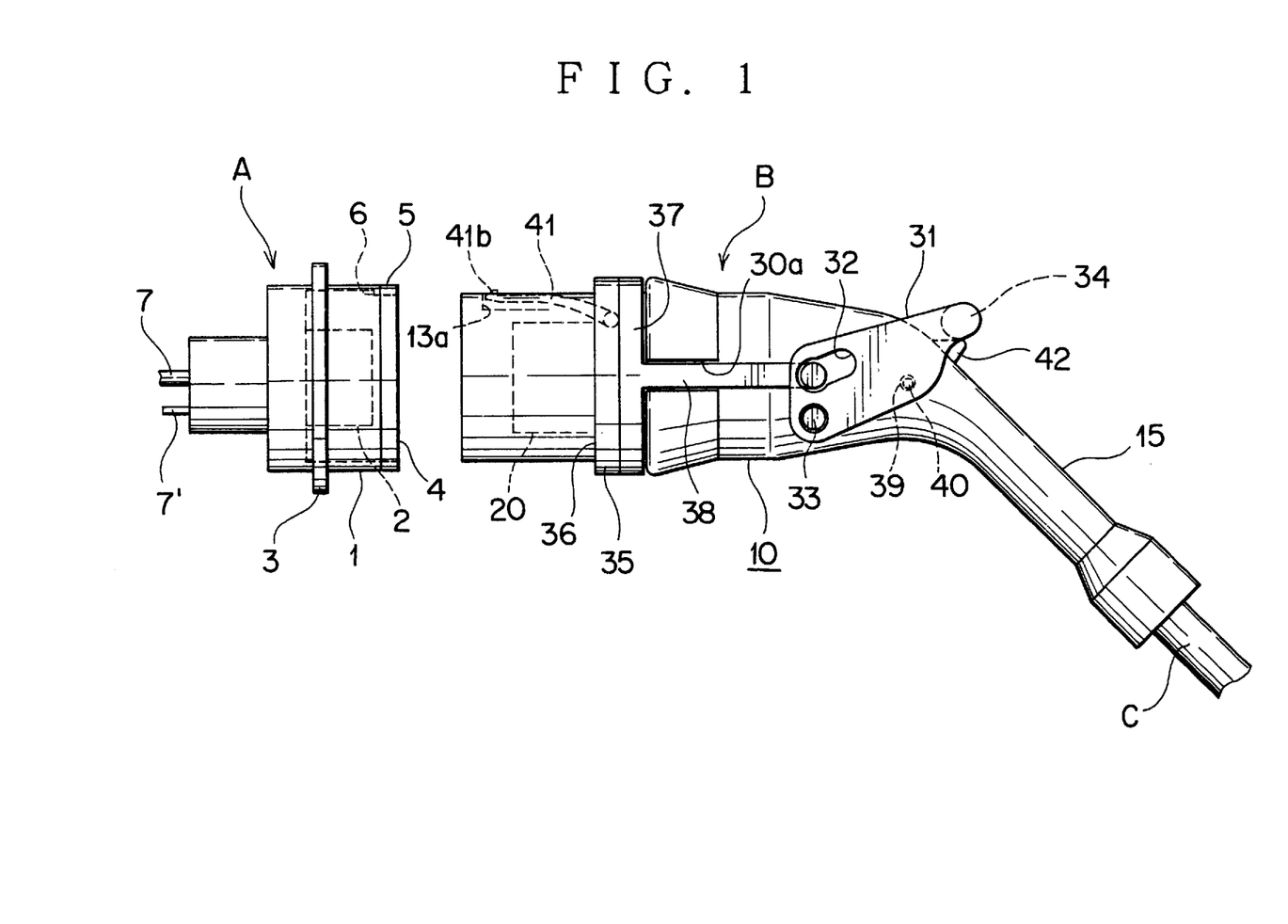
FIG. 1 is a side view of the separation state of a female and a male connector according to one embodiment of the present invention.
Figure 2:
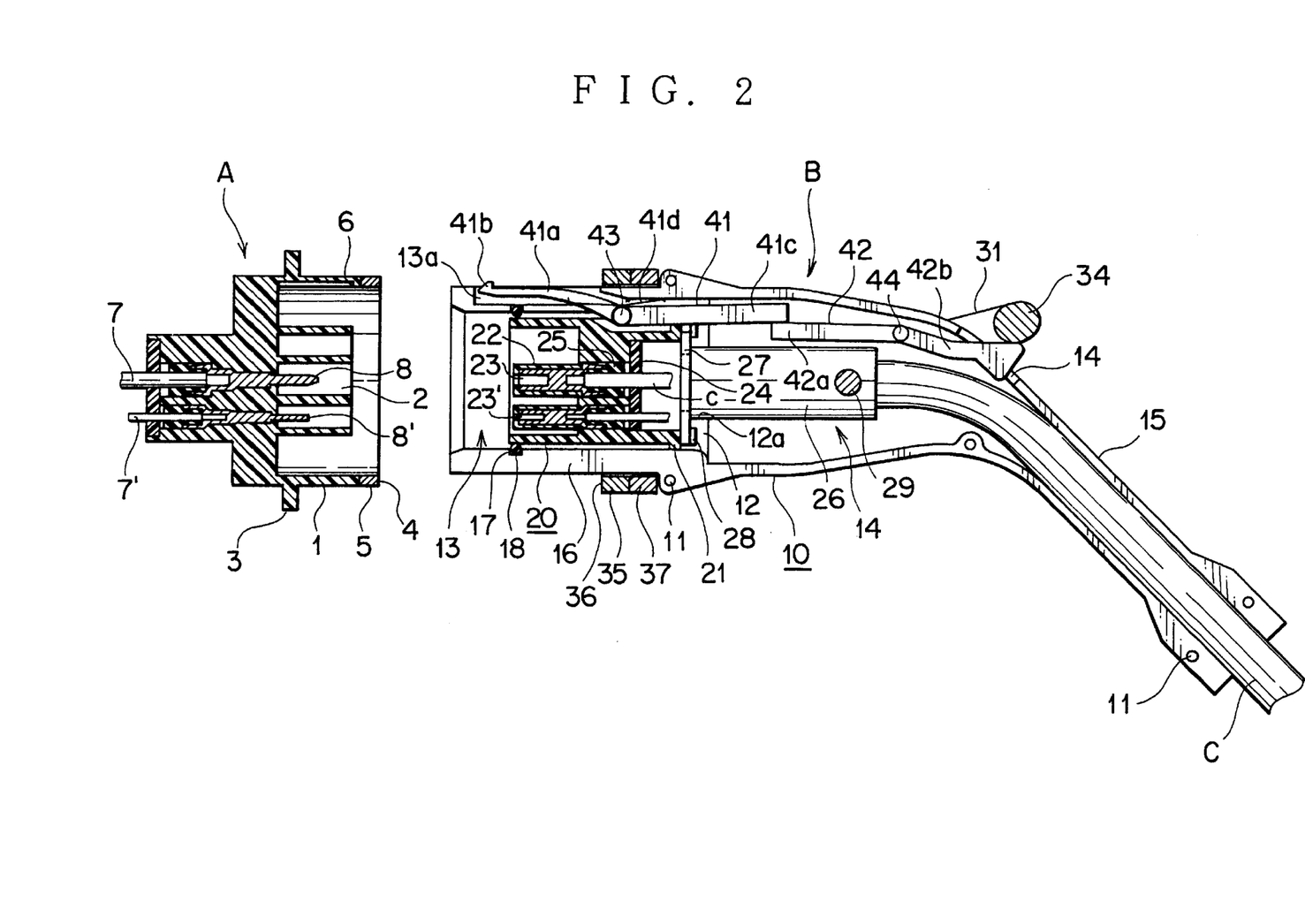
FIG. 2 is a longitudinal sectional view of the male and female connectors shown in FIG. 1.
Figure 3:
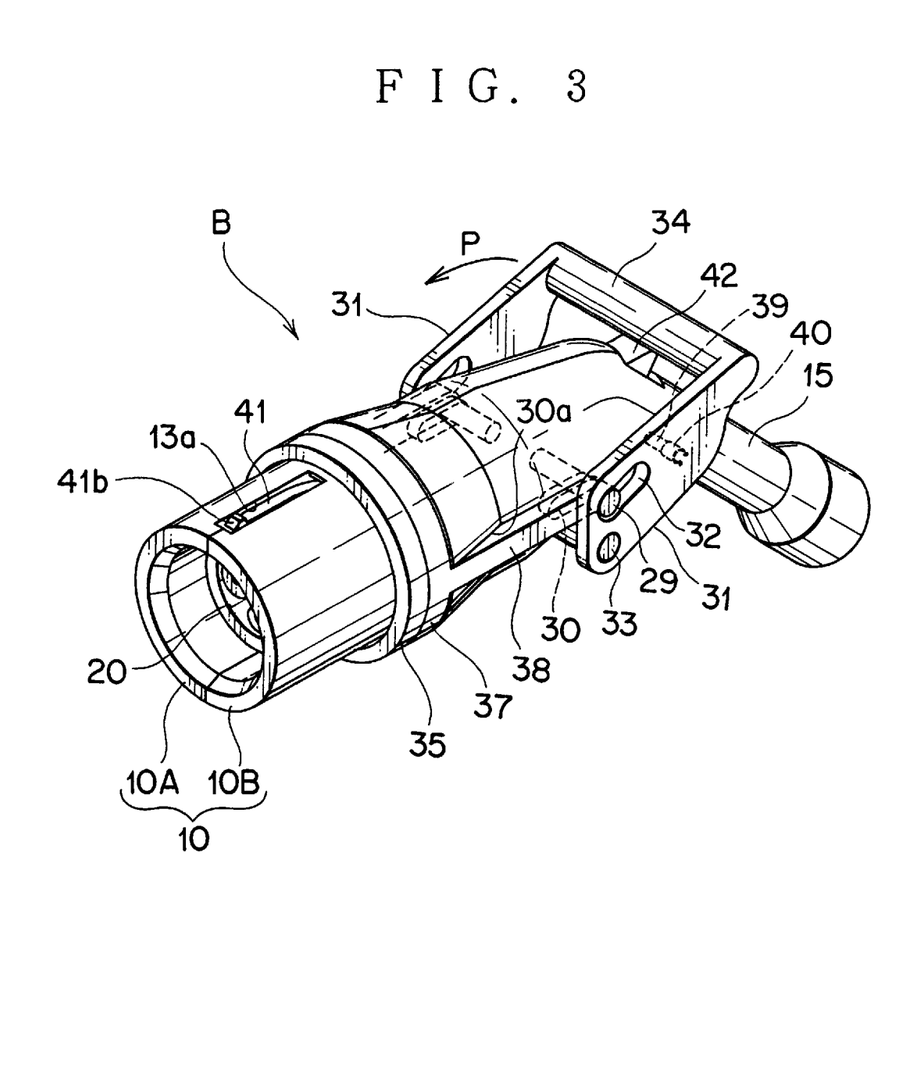
FIG. 3 is a perspective view of the male connector of FIG. 1.

In FIGS. 1 to 3, symbol A denotes a female connector on the power receiving side attached to a vehicle body and symbol B denotes a male connector on the power supplying side which is provided at general houses, offices or several kinds of business places, etc.

The female connector A has a cylindrical shell 1 for receiving the male connector B. Within the shell 1, a plurality of terminal chambers 2 which accommodate and lock male terminals 8 and 8' are provided so as to be secured to a vehicle body (not shown) by a flange 3 attached to the outer periphery of the shell 1.

The front end face of the shell 1 is formed as an abutting face 4 which is to abut in coupling with the male connector B. The front end area inclusive of the abutting face 4 is made of magnetic material 5. At the front end portion of the inner periphery of the shell 1, provided is a locking member 6 to be locked to locking piece 41b of a provisional locking arm 41 (described later) of the male connector B. Numerals 7 and 7' denote lead wires of cables connected to the male terminals 8 and 8'.

The male connector B includes an outer housing 10, a lever 31 rotatably mounted on the outer periphery thereof, an inner connector 20 movable in an axial direction within the outer housing 10 by rotation of the lever 31, a magnet ring 35 movable simultaneously with the inner connector 20, etc. The front end face of the magnet ring 35 has a face 36 which is to abut on the female connector A. A cable C is introduced from a grip 15 at the rear end of the outer housing 10.

The outer housing 10 is composed of a pair of left and right divisional cases 10A and 10B which are fixed by screws screwed into screw holes 11 at both upper and lower edges. The outer housing 10 is divided into a front connector chamber 13 and a rear lever attaching portion 14 by a partition wall 12 having an internal center passage hole 12a. The connector chamber 13 has a cylindrical shape whereas the lever attaching portion 14 has a temple bell shape whose diameter is larger than that of the connector chamber 13 at its front end and gradually decreased toward its rear end. The rear end is communicated with a grip 15.

In the connector chamber 13, a ring-shaped groove 17 is provided in the inner periphery of the tip of a circumferential wall 16. An O-ring 18 made of fluoroplastics and having a frictional resistance is fit in the ring-shaped groove 17. Between the O-ring 18 and the partition wall 12, the inner connector 20 having a flange 21 at the rear end of its outer peripheral wall is slidably mounted.

The inner connector 20 internally has a plurality of terminal chambers 22. In each of the terminal chambers 22, female terminals 23 and 23' are accommodated and fixed. In addition, the female terminals are held by a rear holder 24 so that they are not slipped off rearward. The rear half of each of the female terminals 23 and 23' is connected to the lead wire c of the cable C by a known technique such as crimping, and also covered with a waterproof rubber stopper 25 to seal each of the terminals for waterproof, thus preventing short-circuiting between adjacent terminals.

To the flange 21 at the rear end of the inner connector 20, a flange 27 at the tip of a lead wire protecting tube is bolted by a bolt 28. The lead wire protecting tube 26 passes through the through hole 12a of the partition wall 12 so that its rear end reaches the intermediate portion of the lever attaching portion 14. From both sides of the lever attaching portion 14, cam pins 29 to be engaged with the lever 31 are protruded.

On the other hand, in the outer housing 10, at the intermediate portions of the outer surfaces of both sides of the lever attaching portion 14, slits 30 for guiding the movement of the cam pins 29 are formed in an axial direction. Further, a guide groove is made in a forward extending direction of the slits 30. The front tip of the guide groove 30a is opened on the side of connector chamber 13 whereas the rear tip thereof coincides with the rear tips of the slits to be located centrally of the lever attaching portion 14. In the lever attaching portion 14, the lower end of the lever 31 is rotably supported by a supporting shaft 33 located below the rear tip of the slits 30 whereas the upper end thereof is coupled with a grip rod 34 in a gate shape.

The lever 31 has pin slots 32 at the intermediate portions on its both sides. Into the pin slots 32, the cam pins 29 on both sides of the lead wire protection tube 26 are engaged to penetrate through the slits 30. Further, in the guide grooves 30a located in an extending direction of the slits 30, supporting arms 38 are slidably fit which are located on both sides of a magnet holder 37 for holding the magnet ring 35. The tips of the supporting arms 38 are pivotally mounted on the cam pins 29.

Thus, when the lever 31 is rotated upwards in a direction of arrow P around the supporting shaft 33, the action of cam pins 29 engaged with the pin slots 32 simultaneously move the inner connector 20 and the magnet ring 35. Additionally, a semi-cylindrical locking spring 39 is protruded from the inner wall of the lever 31 and is engaged with a locking pin 40 provided at the lever attaching portion 14 to limit the locking of the lever 31 and the backward rotation thereof.

In the front half of the outer housing 10, above the inner wall thereof, a provisional locking arm 41 is provided, and in the rear half thereof, a locking releasing lever 42 is provided.

Specifically, the intermediate portion of the provisional locking arm 41 is axially supported by a pin 43, the front arm 41a thereof has a hook-shaped locking piece 41b protruded upward at its tip, and the rear arm 41c thereof extends toward the side of the lever attaching portion 14 through the slit (not shown) of the partition wall 12. The locking piece 41b of the front arm 41a is urged upward by a helical spring 41d wound on the pin 43 to protrude externally from a window 13a made on the outer periphery of the connector chamber 13 so that it is engaged with the engagement piece 6 of the female connector 6. The rear arm 41a is formed as a piece to be engaged with the lock releasing bar 42.

The lock releasing bar 42 includes an acting piece 42a and an operating piece 42b which cross in a <-shape. The crossing point is axially supported by a pin 44. In a normal state, the operating piece 42b is urged upward like the front arm 41c of the provisional locking arm 41, and the acting piece 42a is brought into contact with the lower surface of the rear arm 41c of the provisional locking arm 41. The operating piece 42b protrudes from a window 46 formed at the rear portion of the lever attaching portion 14.

An explanation will be given of the operation of coupling the connectors A and B according to the present invention.

Figure 4:
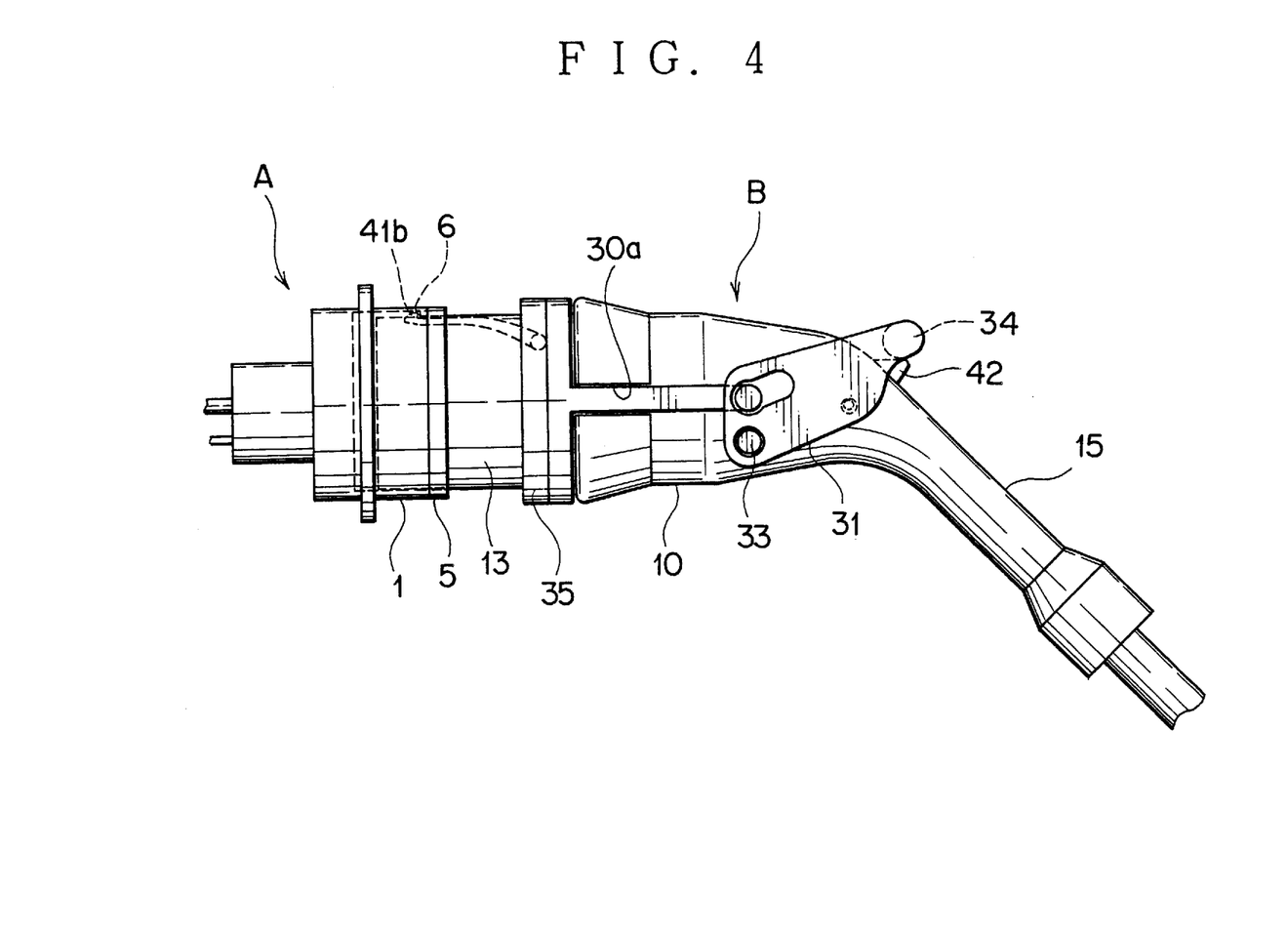
FIG. 4 is a side view of provisional locking of the male and female connectors of FIG. 1.

As shown in FIG. 4, when the connector chamber 13 of the outer housing 10 which is the front portion of the male connector B is fitted into the shell 1 of the female connector A, the locking piece 41b is locked to the locking member 6, FIG. 2, within the shell 1. Thus, the female and male connectors A and B are formed into a provisional coupling or provisional locking state. In this provisional coupling or provisional locking state, the terminal chambers 2 and 22 of the female and male connectors A and B are not yet coupled so that strong force is not required.

Figure 5:
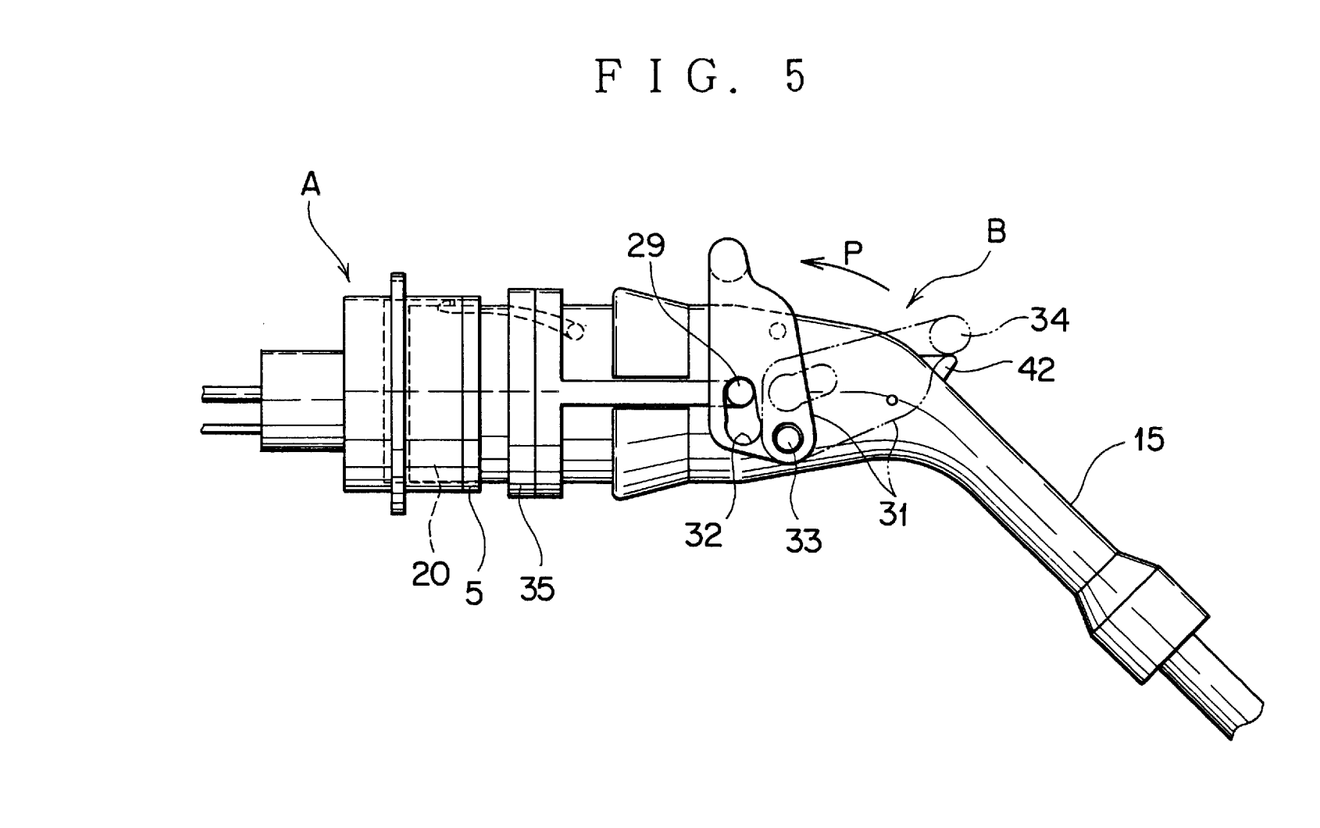
FIG. 5 is a side view of the shifting process from the provisional locking state of connectors to the complete locking state thereof.

Subsequently, as shown in FIG. 5, the lever 31 is rotated upwards as indicated in an arrow P. Specifically, when the gripping rod 34 which is a force applying point is lifted up, by the action of cam pins 29 engaged with the pin slots 32 at the opposite sides of outer housing 11, the inner connector 20 and magnet ring 35 moves forward. Because of this movement, the coupling of the male terminals 8, 8' and female terminals 23, 23' starts to increase insertion force. In addition, as the magnet ring 35 approaches the magnetic substance 5, magnetic adsorption force is also increased. For this reason, the coupling of the female and male connectors A and B can be completed by small force because of the actions of the leverage by the lever 31 and the magnetic adsorption force of the magnet ring 35.

As shown in FIG. 5, at the position where the lever 31 rises substantially upright, the cam pins 29 hit on the front edge of the slits 30 (FIG. 3) to stop. Then, movement of the inner connector 20 for the outer housing 10 also stops.

Figure 6:
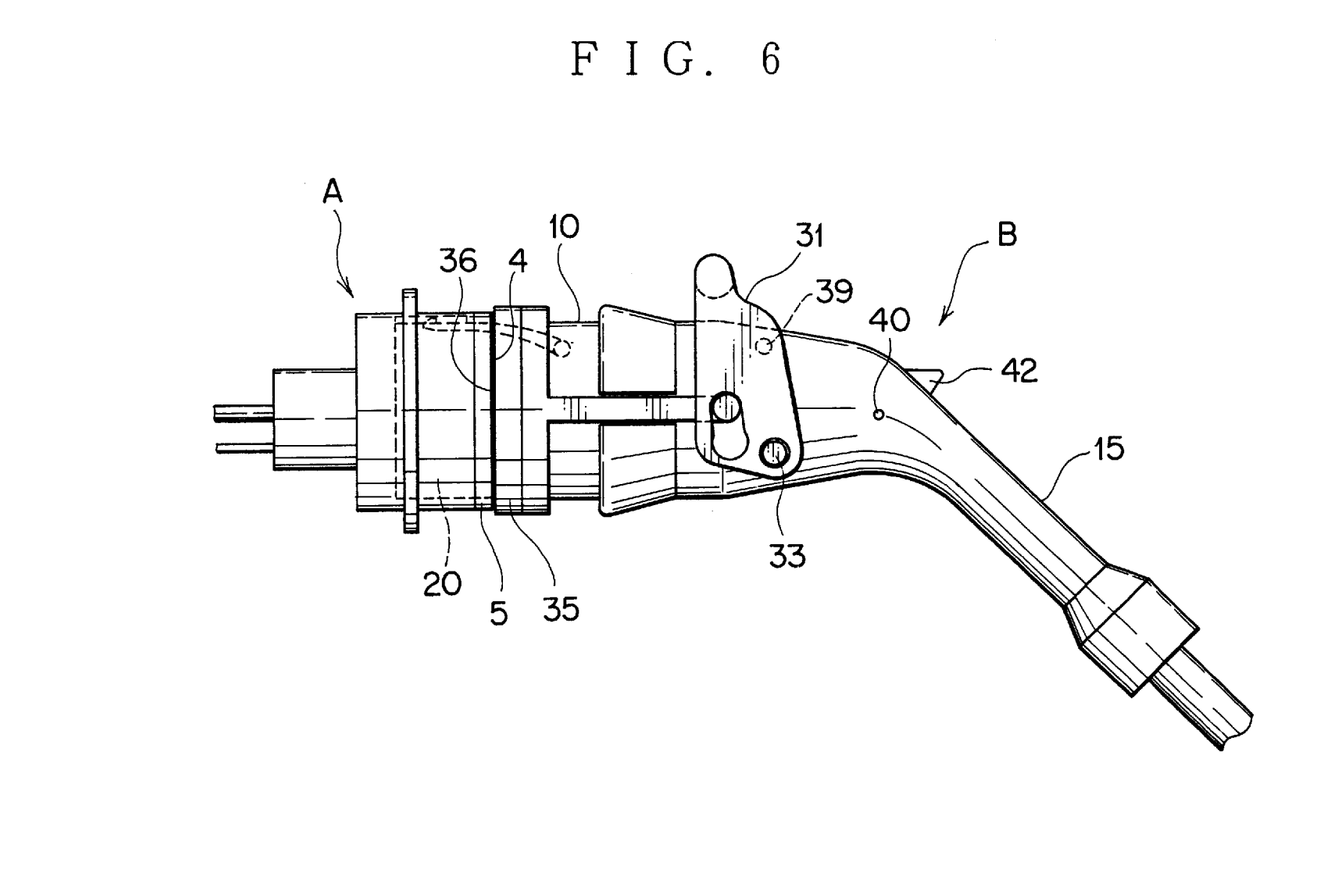
FIG. 6 is a side view of the complete locking state.

FIG. 6 shows the complete coupling and complete engagement (locking) of the female and male connectors A and B. By the magnetic adsorption force between the magnet ring 35 and the magnetic substance 5, the entire male connector B. i.e., outer housing 10 and inner connector 20 move together toward the side of the female connector A. Thus, the coupling of the male terminals 8, 8' and the female terminals 23, 23' are completed. Then, the magnet ring 35 and the magnetic substance 5 are magnetically coupled with each other the abutting faces 36 and 4. As a result, the female and male connectors A and B are completely locked to each other.

Figure 7:
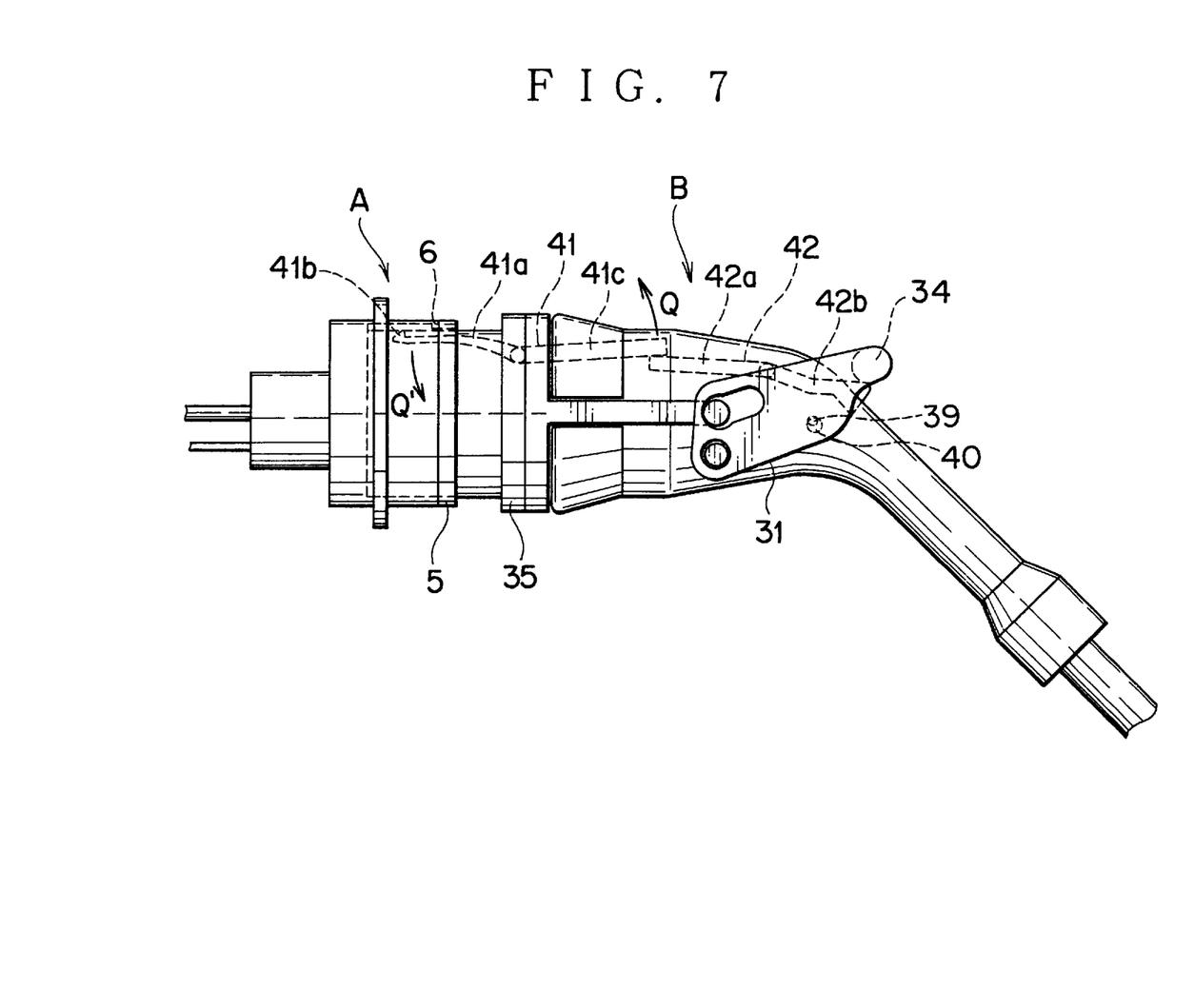
FIG. 7 is a side view of the removing state of connectors.

FIG. 7 shows the process of removal or separation of the female and male connectors A and B from each other.

When the lever 31 is pulled down backwards, the magnet ring 35 and the magnetic substance 5 are separated from each other by the action of leverage. Inversely to the above process, the coupling of the female terminals 23, 23' and male terminals 8, 8' is released in the order of FIG. 6→FIG. 5→FIG. 4. The adsorption force between the magnet ring 35 and the magnetic substance 5 and the coupling force between the male terminals 8, 8' and the female terminals 23, 23' are reduced as the male connector B retracts. Eventually, the connectors A and B return to the provisional coupling state shown in FIG. 4.

When the lever 31 is further pulled down from the above state, as shown in FIG. 7, the locking spring 39 is hit on the locking pin 40 and locked by it. In addition, the gripping rod 34 presses down the operation piece 42b of the lock releasing bar 42. Thus, the operating piece 42a presses up the rear arm 41c of the provisional locking arm 41 as indicated by arrow Q. Then, the front arm 41a rotates as indicated by arrow Q' to release the locking of the locking piece 41b and the locking member 6. In this state, the male connector B may be pull out.

What is claimed is:

1. A connector assembly comprising:

a first connector having an outer housing with a rotatable lever and an inner housing for movement in an axial direction in said outer housing by rotation of said rotatable lever;

a second connector having a shell for receiving said first connector;

a portion of said outer housing of said first connector and said shell of said second connector having faces drawn into abutment with each other by magnetic force when said inner housing of said first connector is received in said shell of said second connector and are engaged with each other, at least one of said engaging faces being made of magnetic material; and said first and second connectors having a provisional lock structure for interconnecting said first and second connectors before substantial magnetic attraction of said first and second connectors due to proximity of said first and second connectors, whereby said first and second connectors are coupled to each other and terminals mounted in said first and second connectors are, respectively, electrically connected to each other.

2. A connector assembly according to claim 1, wherein said provisional locking structure includes a provisional locking arm which can protrude through a window provided in a front half of said outer housing of said first connector and has a first locking member at its tip, and a second locking member provided at an end of an inner wall of said shell, said first locking member is normally urged to protrude from said window, said first and second locking members are locked to each other when said outer housing is received into said shell to constitute said provisional coupling structure.

3. A connector assembly according to claim 2, wherein said outer housing has a locking releasing bar for releasing the provisional locking state of said provisional locking arm.

4. A connector assembly according to claim 3, wherein said provisional locking arm includes a front arm equipped with said first locking member at its tip and a rear arm to be in contact with said bar and is axially supported at a crossing point of said front arm and said rear arm.

* * * * *